(12) United States Patent
Gangal et al.

(10) Patent No.: US 6,197,904 B1
(45) Date of Patent: Mar. 6, 2001

(54) LOW-MELTING TETRAFLUOROETHYLENE COPOLYMER

(75) Inventors: Subash V. Gangal, Hockessin, DE (US); Dewey L. Kerbow, Landenberg; Robert G. Brown, Chadds Ford, both of PA (US); Patrick E. Lindner, Parkersburg, WV (US); Scot David Pedersen, Des Moines, IA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/241,913

(22) Filed: Feb. 2, 1999

Related U.S. Application Data

(60) Provisional application No. 60/076,065, filed on Feb. 26, 1998, and provisional application No. 60/076,004, filed on Feb. 26, 1998.

(51) Int. Cl.[7] .................................................. C08F 116/12
(52) U.S. Cl. ......................... 526/247; 526/242; 526/250; 526/253
(58) Field of Search .................................... 526/242, 247, 526/250, 253

(56) References Cited

U.S. PATENT DOCUMENTS

| | | | |
|---|---|---|---|
| 3,624,250 | 11/1971 | Carlson | 260/80.75 |
| 3,960,825 | 6/1976 | Robinson et al. | 526/206 |
| 4,123,602 | 10/1978 | Ukihashi et al. | 526/206 |
| 4,338,237 | 7/1982 | Sulzbach et al. | 524/777 |
| 4,381,387 | 4/1983 | Sulzbach | 526/247 |
| 4,513,129 | 4/1985 | Nakagawa et al | 526/249 |
| 4,677,175 | 6/1987 | Ihara et al. | 526/254 |

FOREIGN PATENT DOCUMENTS

| | | | |
|---|---|---|---|
| 0 162 455 | 11/1985 | (EP) | C08F/214/26 |
| 7-41522 | 2/1995 | (JP) | C08F/214/26 |

*Primary Examiner*—Helen L. Pezzuto

(57) ABSTRACT

Copolymers of tetrafluoroethylene and ethylene having modifiers comprising perfluoro(alkyl vinyl ether) have low melting points. The copolymers also have low flex modulus.

18 Claims, No Drawings

LOW-MELTING TETRAFLUOROETHYLENE COPOLYMER

RELATED APPLICATION

This application claims the benefit of Provisional Applications Ser. No. 60/076,065 and Ser. No. 60/076,004, both filed Feb. 26, 1998.

FIELD OF THE INVENTION

This invention is in the field of melt-fabricable copolymers of tetrafluoroethylene, specifically copolymers of tetrafluoroethylene and ethylene.

BACKGROUND OF THE INVENTION

Crystalline dipolymers of tetrafluoroethylene (TFE) and ethylene (E) can be produced over the entire composition range from polyethylene to polytetrafluoroethylene, creating polymers which melt between about 110° C. and 327° C. At about 50/50 molar ratio, where TFE/E copolymers are typically produced, a local maximum in the melting point curve is encountered. At this 50/50 ratio, a number of other properties also reach a local maximum (or minimum), such as modulus and crystallinity. This phenomenon was recognized by Carlson in U.S. Pat. No. 3,624,250. He defined a range of 60/40 to 40/60 which encompasses most of this local maximum. At the maximum, melting points of 270°–285° C. can be achieved.

Dipolymers of ethylene and tetrafluoroethylene have poor resistance to stress cracking, particularly at elevated temperature. Incorporation of a termonomer (Carlson, U.S. Pat. No. 3,624,250) was found to improve stress crack resistance and provide polymers which have found wide application in wire and cable coatings, films, and injection moldings. Many termonomers have been found to provide the desired cracking improvement in TFE/E polymers, including most common fluorocarbon and hydrocarbon vinyl compounds that introduce a bulky side group into the polymer. However, a limited number of such termonomers have been used in the commercial manufacture of TFE/E resins, including perfluorobutyl ethylene (PFBE), hexafluoropropylene (HFP), perfluoro(propyl vinyl ether) (PPVE), hexafluoroisobutylene (HFIB) and $CH_2=CF(CF_2)_3H$. Known TFE/E copolymers that are terpolymers are described, for example, in U.S. Pat. Nos. 3,960,825; 4,123,602; 4,513,129 and 4,677,175; and in Published Japanese Patent Application (Kokai) 07(1995)-041522.

Sulzbach in U.S. Pat. No. 4,381,387 discloses a quaterpolymer having a melting point of 245°–280° C. and consisting essentially of 55–30 mol % TFE, 60–40 mol % ethylene, 10–1.5 mol % HFP, and 2.5–0.05 mol % of a bulky vinyl monomer selected from one of a number of classes, including a class of perfluoro(alkyl vinyl ethers) (PAVE). This patent is said to provide TFE/E copolymers which provide a satisfactory compromise between thermal and chemical stability on the one hand and the tensile and elongation behavior on the other hand, with the use of a smaller quantity of a bulky vinyl compound. However, melting points achieved in the '387 patent are not low despite substantial incorporation of HFP. Sulzbach's Example 6 quaterpolymer has TFE/E/HFP/PPVE molar composition of 47.0/44.3/8.4/0.4 and a melting point of 247° C. The Example 14 quaterpolymer uses perfluorohexyl ethylene (PFHE) instead of PPVE and has TFE/E/HFP/PFHE molar composition of 45.4146.5/3.7/0.2 and a melting point of 272° C. Furthermore, it is well-known that the reactivity of HFP is low, so the use of a substantial quantity of HFP adversely affects polymerization rate. Sulzbach & Hartwimmer in U.S. Pat. No. 4,338,237 disclose a polymerization process for preparing TFE/E copolymers, including the quaterpolymers disclosed in the '387 patent.

In EXAMPLE I of U.S. Pat. No. 3,624,250, Carlson discloses a TFE/E/PPVE copolymer having molar composition of 48.8/48.8/2.4, respectively, and a melting point of 255° C., and in EXAMPLE III the TFE/E/PEVE counterpart having a melting point of 262° C., PEVE being perfluoro (ethyl vinyl ether).

TFE/E copolymers that have low stiffness and have good flex life at elevated temperature are needed for such applications as flexible, thin-wall appliance wiring and in coatings on large-diameter cables. Particularly desired are TFE/E copolymers having sufficiently low melting temperatures that the copolymers can be melt processed together with thermally less stable polymers such as fluorine-free polymers, i.e., co-processed such as by co-extrusion. Such composites are currently sought, for example, for fuel hose applications which require a combination of fuel resistance, ruggedness, and flexibility.

SUMMARY OF THE INVENTION

This invention provides a partially-crystalline melt-fabricable copolymer comprising major fractions of tetrafluoroethylene and ethylene, and minor fractions of at least one perfluoro(alkyl vinyl ether), said alkyl having 1–5 carbon atoms, and optionally fluoroalkyl ethylene, said fluoroalkyl having 2–10 carbon atoms. The minor fractions are present in an amount effective to yield copolymer having a melting point of no more than 220° C. It has been discovered that, when fluoroalkyl ethylene is not present, this low melting point can be obtained when the total concentration of perfluoro(alkyl vinyl ether) in the copolymer is at least 3 mol % based on total monomer units in the copolymer. It has also been discovered that, when fluoroalkyl ethylene is present, the combined concentration of minor fractions in the copolymer is at least 2 mol %, preferably at least 3 mol %. More preferably, the total concentration of minor fractions in the copolymer, with fluoroalkyl ethylene present or not, is at least 4 mol %. Preferred perfluoro(alkyl vinyl ethers) include perfluoro (ethyl vinyl ether), and preferred fluoroalkyl ethylenes include perfluorobutyl ethylene.

The molar ratio of tetrafluoroethylene to ethylene in the copolymers of the invention is in the range of from 73/27 to 40/60. In the most preferred embodiment of the invention, this molar ratio is greater than 60/40.

In a preferred embodiment, the invention provides low-melting copolymers of tetrafluoroethylene and ethylene having low flex modulus.

As a result of low melting temperature, the copolymers can advantageously be co-processed with less thermally stable polymers at temperatures at which such polymers are essentially thermally stable.

DETAILED DESCRIPTION

Copolymers of the present invention comprise tetrafluoroethylene (TFE), ethylene (E), and perfluoro(alkyl vinyl ether) (PAVE). TFE and ethylene are present in major amounts, consistent with the general characterization as a TFE/E copolymer. PAVE is present in minor amount. Optionally, fluoroalkyl ethylene (FAE) can also be present in minor amount in addition to PAVE. These modifiers provide the desirable results of effective reduction of melting point, good flexibility (low flex modulus) and flex resistance, and high polymerization rate.

The TFE/E copolymers of the present invention are partially-crystalline, by which is meant that the copolymers exhibit a crystalline melting point by differential scanning calorimetry (DSC). Preferably, the melting endotherm has a heat of fusion of at least 3 J/g, more preferably at least 10 J/g.

The crystalline melting points of the copolymers of the present invention are surprisingly low, no more than 220° C., preferably no more than 215° C., and more preferably no more than 210° C. The amount of PAVE, and optionally FAE, present in the copolymer, is effective to yield such melting temperatures. As illustrated by examples to follow, exceptionally low melting temperatures have been obtained for TFE/E copolymer compositions for which the concentration of TFE exceeds the concentration of ethylene.

Preferably, in addition to low melting temperature, the TFE/E copolymers of the invention have low flex modulus. Flex modulus is preferably no more than 100,000 psi (690 MPa), more preferably no more than 70,000 psi (483 MPa), and most preferably no more than 65,000 psi (448 MPa).

The TFE/E copolymers of the invention contain units derived from TFE and ethylene in major amount, and units derived from PAVE and optionally FAE in minor amounts. "Major" and "minor" as used herein are relative to 20 mol %. That is, "major amount" or "major fraction" means that TFE and ethylene are each present in the copolymer in the amount of at least 20 mol % based on total copolymer, while "minor amount" or "minor fraction" means that PAVE and FAE, if present, are each present in an amount of less than 20 mol %.

For the TFE/E copolymers of the present invention, TFE/E molar ratios in the range of from 73/27 to 40/60 are desired. The incorporation of modifier(s) appears to be especially effective if the TFE/E polymer has a TFE/E molar ratio higher than 50/50, and ratios in the range of from 73/27 to 50/50 are preferred. Ratios in the range of from 73/27 to 55/45 are more preferred, and TFE/E molar ratios greater than 60/40 are especially preferred. Within the aforesaid ranges, the corresponding ranges having TFE/E ratios of 70/30 instead of 73/27 are more preferred. As molar TFE content of TFE/E dipolymer increases above the 50/50 ratio, the melting point of TFE/E dipolymer passes through a local minimum at a TFE/E ratio near 65/35, at which melting points of about 260°–265° C. are observed. See R. A. Naberezhnkh et al., Vysokomol. Soedin. 19, 33 (1977). At about 70 mol % TFE, the melting point of the dipolymer begins to increase again with increasing TFE/E ratio and the melt processibility of the copolymer begins to decline rapidly as longer sequences of TFE occur. However, the low-melting TFE/E copolymers of the present invention can have TFE/E ratios greater than 70/30.

The modifying comonomer used in the TFE/E copolymers of this invention is at least one PAVE in which the alkyl group has 1–5 carbon atoms, preferably 1–3 carbon atoms. PEVE is especially preferred, either as the sole PAVE or in combination with other PAVE. When FAE is not present in the copolymer, the concentration of PAVE comonomer units in the copolymers is at least 3 mol %, preferably at least 4 mol %, based on total combined units of TFE, E and PAVE in the TFE/E copolymer. Normally, the concentration of PAVE will be no more than 15 mol %, preferably no more than 10 mol %.

The FAE type of modifying comonomer optionally used in the TFE/E copolymers of this invention has the general formula $CH_2=CH-R_f$ wherein $R_f=(CF_2)_nY$, n=2–10, and Y=F, H, or Cl. Preferred FAE comonomers have Y=F, in which case the FAE is perfluoroalkyl ethylene (PFAE). The most preferred PFAE is perfluorobutyl ethylene (PFBE, n=4). More than one FAE can be used. The concentration of FAE comonomer units in the copolymer is no more than 3 mol %, and if present is preferably 0.3–3 mol %, most preferably 0.3–2.0 mol %, based on total monomer units in the TFE/E copolymer. FAE are known compounds. See, for example, U.S. Pat. No. 4,123,602.

When FAE is present in the copolymer along with PAVE, the concentration of PAVE comonomer units in the copolymers is 0.5–15 mol %, preferably 0.5–10 mol %, and most preferably 0.7–7 mol %, based on total units of TFE, E, FAE and PAVE in the copolymer.

When FAE is present the concentrations of FAE and PAVE in the TFE/E copolymers of this invention as stated above are such that the combined concentration of FAE and PAVE is at least 2 mol %, based on total units of TFE, E, FAE and PAVE combined. Preferably, the combined concentration is at least 3 mol %, more preferably at least 4 mol %, i.e., the same as for PAVE when FAE is not present in the copolymer. Though not required, it is often advantageous for the concentration of PAVE to exceed the concentration of FAE, based on the molar concentrations in the TFE/E copolymer.

One skilled in the art will recognize that modifying comonomers in addition to FAE and PAVE can be present in the TFE/E copolymers of this invention. If such additional modifying comonomer is present, it will be in minor concentration relative to PAVE.

Notably, incorporation of PAVE in combination with PFBE has been found to be beneficial in reducing melting point. While PFBE reduces the overall polymerization rate at any given TFE/E ratio, this problem can be alleviated when PAVE is used in combination with PFBE in TFE/E copolymers. As provided in one embodiment of the invention, PAVE can be used without fluoroalkyl ethylene being present.

The TFE/E copolymers of this invention are melt-fabricable. As such, they usually have molecular weights such that melt flow rate (MFR) as normally measured for TFE/E copolymers is in the range of about 1–50 g/10 min, though MFR values outside this range are known. Preferably, MFR is in the range of 1–25 g/10 min, more preferably 2–25 g/10 min.

The TFE/E copolymers of this invention can be made by any of the polymerization techniques known in the art of TFE/E copolymers. These include but are not limited to solution polymerization, suspension polymerization, and dispersion polymerization including dispersion polymerization in the presence of a solvent. Processes including continuous, semi-continuous, batch, or semi-batch processes can be used.

By way of illustration, a non-aqueous polymerization to make a TFE/E/PEVE copolymer can be carried out generally as follows. A suitable autoclave, preferably a stirred autoclave, is first charged with a suitable solvent such as 1,1,2-trichloro-2,2,1-trifluoroethane (CFC-113), and the vapor space is purged with nitrogen and evacuated to remove oxygen. While under vacuum, a chain transfer agent (CTA) or solution of CTA can be drawn in from a stockpot if CTA is to be used, as is common for TFE/E copolymers. A chosen amount of PEVE is injected using a positive displacement pump, and ethylene is added to increase reactor pressure to the desired level. Then, TFE is added to increase pressure by a predetermined amount. The contents of the autoclave are then heated to the desired reaction temperature, e.g., 60° C., while agitating, and a suitable initiator or initiator solution, such as a solution of perfluoropropionyl peroxide in CFC-113 is added to initiate polymerization. When polymerization starts, as indicated by a drop in pressure, a makeup stream of TFE/ethylene in predetermined proportions is begun to maintain pressure at the original point. Also, addition of initiator solution is begun. Optionally, PEVE in predetermined amount is added on a predetermined schedule. The reaction is thus continued for a predetermined time or until a predetermined amount of mixed gases have been added. The vessel contents are then cooled and the autoclave is vented. The resulting polymer suspension is then discharged from the autoclave and dried.

If desired, other PAVE and/or FAE can be included in the reaction along with PEVE.

As indicated above, various profiles can be employed to introduce PEVE (or other PAVE or FAE modifier) into the polymerization. For example, in a semi-batch process, PEVE can be precharged, added during the reaction, or introduced by a combination of precharge and addition during the reaction. It is preferred that the introduction of PEVE includes addition during the reaction to enhance the uniformity of the copolymer. The addition of PEVE during reaction can be continuous or intermittent. One skilled in the art will recognize that continuous addition can be uniform or non-uniform, but will usually be uniform. Likewise, one skilled will recognize that intermittent additions can be equal or unequal and at equal or unequal intervals, but will usually be equal and at equal intervals. Additionally, if more than one modifying comonomer is used, one skilled will recognize that they need not be introduced according to the same profile.

The desired physical form of the TFE/E copolymer resin will normally vary with the intended use. For the various powder coating techniques, for example, powders, small beads, or small granules are suitable. These may be obtained simply by drying the product of polymerization, optionally accompanied by grinding or milling operations, or by various agglomeration or pelletization techniques known in the art. The desired size of these finely divided resins will vary over the range 0.01–2 mm depending on intended application. For extrusion uses such as wire coating, cubes or pellets formed by extrusion techniques are commonly used. Particle size may be analyzed by any of the known methods appropriate to the size range of the sample. For example, a light scattering technique such as with a Microtrac Particle Size Analyzer (available from Leeds & Northrup) or an electrical impedance technique such as with a Coulter Multisizer (available from Coulter Corp.) may be used for small-particle powders, while screen analysis may be used for larger particles and pellets.

EXAMPLES

The volume employed in calculating space-time yields in the following examples and comparisons is the volume of solvent (CFC- 113) initially charged to the reactor. The polymer yield either is the total amount of polymer obtained by drying the suspension discharged from the reactor or is calculated from the solids content of the suspension using 1.57 g/cm$^3$ as the density of CFC-113.

TFE/E copolymer compositions are determined by elemental and $^{19}$F NMR analyses. The NMR results are used to determine the relative amounts of fluorine-containing units, and the elemental analysis results are used to obtain carbon content. Then, a set of simultaneous equations relating monomer unit populations and relating carbon content to composition are solved numerically.

The melt flow rate (MFR) of TFE/E copolymer resins is measured according to ASTM D-3159. MFR is related to melt viscosity (MV) by the relationship MV 32.0/MFR, when MFR is in units of g/10 min and MV is in units of $10^3$ Pa-s.

Thermal characteristics of fluoropolymer resins are determined by differential scanning calorimetry (DSC) by the method of ASTM D-4591-87. The melting temperature reported is the peak temperature of the melting endotherm. Unless otherwise stated, melting temperature and associated heat of fusion are for second heating of the polymer sample.

Unless otherwise specified, samples for physical property testing are prepared by compression molding the TFE/E copolymer resin into a 10 mil (0.25 mm) thick film at 300° C., followed by ice water quench or by quenching between cold metal plates. Specimens are cut from the film as appropriate for each test Unless otherwise stated, all physical property testing is done at room temperature.

Tensile tests are conducted according to ASTM D-1457. Flex modulus is measured according to ASTM D-790.

Flex resistance is measured using specimens that are 0.030 inch (0.76 mm) thick in the DiMattia Flex Life test at 150° C. according to ASTM D-813-87, except that the samples are not pierced. Reported values are the average of results for three samples, unless stated otherwise. If a specimen survives 2.5×10$^6$ cycles, the test is stopped and the specimen is considered not to fail. The DiMattia Flex Life, at 150° C., is especially significant because of the tendency of TFE/E copolymers toward stress cracking at elevated temperature.

MIT Flex Life is measured using the standard MIT folding endurance tester described in ASTM D-2176, using a film 0.008 inch (0.2 mm) thick.

In the following, unless otherwise stated, solution concentrations are based on combined weight of solvent and of solute(s).

Example 1

A 1-liter stainless steel autoclave equipped with a blade-type agitator and having manually-controlled feed systems is charged with 800 mL of 1,1,2-trichloro-2,2,1-trifluoroethane (CFC-113). The vapor space is purged with nitrogen and evacuated to remove oxygen. While under vacuum, 1.5 mL of perfluorobutyl ethylene and 0.5 mL of cyclohexane are drawn in from a stockpot. From a positive displacement pump, 1.0 mL of perfluoro(ethyl vinyl ether) is added. Ethylene is added to increase reactor pressure by 9.5 psi (0.066 MPa). Then, TFE is added to increase pressure by 110 psi (0.76 MPa). The contents of the autoclave are heated to 60° C. while agitating. Then, 15 mL of a 0.0053 g/mL solution of perfluoropropionyl peroxide (3P) in CFC-113 is added to initiate polymerization. When pressure decreases by 5 psi (0.03 MPa), a makeup stream of 60/40 molar TFE/ethylene is begun to maintain pressure at the original point. Also, addition of 3P initiator solution is begun at 1.2 mL/min. Every 4 min. additions of 0.2 mL of PFBE, as a 10 vol % solution in CFC-113, and 1.0 mL of PEVE are made. The reaction is continued for 15 min after addition of mixed gases is begun The vessel contents are then cooled and the autoclave is vented. Resulting polymer suspension is transferred to an aluminum pan to dry at 150° C. in a circulating air oven. The dried copolymer resin weighs 43 g, so space-time yield is 215 g/L-hr. The copolymer composition (TFE/

E/PFBE/PEVE) is 55.4/39.2/0.6/4.9 on a molar basis. Melting point is 198° C. with a relatively weak and broad component at even lower temperature and MFR is 1.25 g/10 min. Tensile strength is 4356 psi (30 MPa), tensile elongation is 245%, and flex modulus is 648 MPa. DiMattia Flex Life is greater than $2.5 \times 10^6$ cycles; i.e., the specimen does not fail in the DiMattia test.

Example 2

The procedure of Example 1 is essentially repeated, except for differences indicated in Table 1. Compositions and properties of the copolymers are also given in Table 1. Melting points are low, flex modulus values are low, and polymerization rates (space-time yields) are high.

TABLE 1

Procedures and Compositions for Examples 1–2

| Example | 1 | 2 |
|---|---|---|
| Process details: | | |
| PFBE charge (mL) | 1.5 | 2.0 |
| Cyclohexane (mL) | 0.5 | 0.9 |
| PEVE charge (mL) | 1.0 | 1.0 |
| Ethylene Δp (MPa) | 0.066 | 0.066 |
| 3P feed (mL/min) | 1.2 | 1.2 |
| PFBE (mL every 4 min) | 0.2 | 0.3 |
| PEVE (mL every 4 min) | 1.0 | 1.0 |
| Polymer solids (g) | 43.0 | 31.3 |
| Space-time yield (g/L · hr) | 215 | 157 |
| Polymer Characteristics: | | |
| TFE (mol %) | 55.4 | 60.7 |
| E (mol %) | 39.2 | 36.2 |
| PFBE (mol %) | 0.6 | 1.3 |
| PEVE (mol %) | 4.9 | 1.7 |
| TFE/E molar ratio | 59/41 | 63/37 |
| Melting point (° C.) | 198 | 217 |
| MFR (g/10 min) | 1.25 | 24.3 |
| Tensile strength (MPa) | 30.0 | 36.6 |
| Tensile elongation (%) | 245 | 342 |
| Flex modulus (MPa) | 648 | 587 |
| DiMattia Flex Life ($10^6$) | >2.5 | 0.27 |

Example 3

The procedure of Example 1 is essentially repeated, except that the initial charge of PEVE is 4 mL and no PEVE is added after polymerization is initiated. The dried copolymer resin weighs 35.9 g, so space-time yield is 179.5 g/L·hr. The resulting copolymer exhibits a major broad melting endotherm with its peak (melting point) at about 145° C., with lesser peaks at 195° C. and at about 204° C. The unusually low melting point and the shape of the melting endotherm indicate rapid incorporation of PEVE into the TFE/E copolymer, resulting in depletion of the PEVE charge during the batch and, consequently, the formation of non-uniform polymer. That is, it is believed that the copolymer formed early in the batch is rich in PEVE while that formed late in the batch is relatively lean in PEVE.

Examples 4–10

A 1-liter stainless steel autoclave equipped with a blade-type agitator and having computer-controlled feed systems is evacuated, purged with nitrogen, and evacuated again. While under vacuum, 25 mL of a 31.2 g/L solution of cyclohexane in CFC-113 and an amount of CFC-113 are drawn in from a stockpot. Also drawn in is a quantity of a 38 g/L solution of PFBE in CFC-113 sufficient to introduce the precharged amount of PFBE shown in Table 2. From a positive displacement pump, the amount of one or more PAVE shown in Table 2 is added. The amount of CFC-113 is such that the precharge of cyclohexane solution, CFC-113, PFBE solution, and PAVE is 800 mL total. The contents of the autoclave are heated to 60° C. while agitating. With the temperature stable, first ethylene and then TFE are added to increase pressure by the amounts shown in Table 2. Then, 25 mL of a 0.0060 g/mL solution of 3P in CFC-113 are added to initiate polymerization. When pressure decreases by 5 psi (0.03 MPa), a make-up stream of 60/40 molar ratio of TFE/ethylene is started to maintain pressure at the original point. Also, addition of the same 3P initiator solution is begun at 1.2 mL/min, and the same PFBE solution and/or PAVE(s) is/are added to provide the feed rate(s) shown in Table 2 for the modifying comonomer(s). The reaction is continued for 20 min after addition of mixed gases is begun. Then, all feeds are stopped, the contents of the autoclave are cooled, and the autoclave is vented. The resulting copolymer suspension is transferred to an aluminum pan and dried at 150° C. in a vacuum oven. Copolymer properties are shown in Table 3. Films for physical testing specimens are molded at a temperature 20° C. above the melting point of the copolymer.

TABLE 2

Process Conditions for TFE/E Copolymer Polymerizations of Examples 4–10

| TFE/E/PFBE/PAVE Tests | 4 | 5 | 6 | 7 | 8 | 9 | 10 |
|---|---|---|---|---|---|---|---|
| Process details: | | | | | | | |
| PMVE precharge (mL) | — | — | 8.5 | — | — | 50 | 63 |
| PEVE precharge (mL) | 15 | 15 | 6.5 | 70 | — | — | — |
| PPVE precharge (mL) | — | — | — | 20 | 60 | — | — |
| PFBE precharge (mL) | 2.6 | 3.6 | 2.6 | — | — | 1.3 | 1.3 |
| Ethylene Δp (MPa) | 0.07 | 0.08 | 0.06 | 0.07 | 0.07 | 0.03 | 0.02 |
| TFE Δp (MPa) | 0.81 | 0.79 | 0.81 | 0.76 | 0.76 | 0.90 | 0.83 |
| PMVE feed (mL/min) | — | — | 1.7 | — | — | 5.0 | 2.0 |
| PEVE feed (mL/min) | 2.0 | 3.0 | 1.3 | 2.0 | — | 2.0 | — |
| PPVE feed (mL/min) | — | — | — | — | 2.0 | — | — |
| PFBE feed (mL/min) | 0.05 | 0.05 | 0.05 | — | — | — | — |
| Yield (g) | 54 | 55 | 46 | 42 | 51 | 34 | 73 |
| Space-time yield (g/L · hr) | 201 | 208 | 173 | 210 | 257 | 161 | 358 |

TABLE 3

Properties of TFE/E Copolymers of Examples 4–10

| TFE/E/PFBE/PAVE Tests | 4 | 5 | 6 | 7 | 8 | 9 | 10 |
|---|---|---|---|---|---|---|---|
| Polymer Characteristics: | | | | | | | |
| TFE (mol %) | 55.9 | 56.5 | 63.2 | 58.2 | 59.1 | 63.6 | 67.2 |
| E (mol %) | 41.1 | 38.7 | 32.8 | 35.8 | 36.6 | 30.9 | 28.6 |
| PMVE (mol %) | — | — | 1.4 | — | — | 4.9 | 3.6 |
| PEVE (mol %) | 1.8 | 3.4 | 1.1 | 5.0 | — | — | — |
| PPVE (mol %) | — | — | — | 1.0 | 4.3 | — | — |
| PFBE (mol %) | 1.2 | 1.4 | 1.6 | — | — | 0.6 | 0.6 |
| TFE/E molar ratio | 58/42 | 59/41 | 66/34 | 62/38 | 62/38 | 67/33 | 70/30 |
| Melting point (° C.) | 217 | 209 | 210 | 188 | 201 | 205 | 212 |
| Heat of fusion (J/g) | 23 | 19 | 26 | 22 | 25 | 26 | 28 |
| MFR (g/10 min) | 25 | 12 | 44 | 3 | 4 | 4 | 97 |
| Tensile strength (MPa) | 25 | 37 | 21 | 32 | 34 | 30 | 25 |
| Tensile elongation (%) | 255 | 312 | 310 | 309 | 338 | 373 | 278 |
| MIT Flex Life ($10^3$) | 163 | 802 | 70 | 540 | 972 | 222 | 39 |
| Flex modulus (MPa) | 481 | 444 | 413 | 414 | 391 | 405 | 446 |

What is claimed is:

1. A partially-crystalline melt-fabricable copolymer comprising major fractions of tetrafluoroethylene and ethylene minor and minor fractions of at least one perfluoro(alkyl vinyl ether), said alkyl having from 1–5 carbon atoms and fluoroalkyl ethylene, wherein said minor fractions are present in an amount effective to yield a melting point of no more than 220° C. for said polymer, the molar amount of said fluoroalkyl ethylene being 0.3 to 2.0%.

2. The copolymer of claim 1 wherein the combined molar amount of fluoroalkyl ethylene and perfluoro(alkyl vinyl ether) is at least 3 mol %, based on the combined units of tetrafluoroethylene, ethylene, fluoroalkyl ethylene, and perfluoro(alkyl vinyl ether) present in said copolymer.

3. The copolymer of claim 2, wherein the molar amount of said perfluoro(alkyl vinyl ether) present is from 0.7% to 7%, based on the combined units of tetrafluoroethylene, ethylene, fluoroalkyl ethylene, and perfluoro(alkyl vinyl ether) present in said copolymer.

4. The copolymer of claim 1, wherein said fluoroalkyl ethylene is perfluoroalkyl ethylene.

5. The copolymer of claim 4, wherein said perfluoroalkyl ethylene is perfluorobutyl ethylene.

6. The copolymer of claim 1, wherein the molar amount of said perfluoro(alkyl vinyl ether) present is no more than 15 mol %.

7. The copolymer of claim 1, wherein said perfluoro(alkyl vinyl ether) is perfluoro(ethyl vinyl ether).

8. The copolymer of claim 1, wherein the molar ratio of said tetrafluoroethylene to said ethylene is in the range of from 73/27 to 40/60.

9. The copolymer of claim 8, wherein said molar ratio is in the range of from 70/30 to 50/50.

10. The copolymer of claim 8, wherein said molar ratio is in the range of from 70/30 to 55/45.

11. The copolymer of claim 10, wherein said molar ratio is greater than 60/40.

12. The copolymer of claim 1 having a melting point no more than 215° C.

13. The copolymer of claim 1 having a melting point no more than 210° C.

14. A partially-crystalline melt-fabricable copolymer comprising major fractions of tetrafluoroethylene and ethylene, a minor fraction of at least one perfluoro(alkyl vinyl ether), said alkyl having from 1–5 carbon atoms, the amount of said perfluoro(alkyl vinyl ether) being at least 3 mol % based on the combined molar amounts of tetrafluoroethylene, ethylene, and perfluoro(alkyl vinyl ether) present in said copolymer, said copolymer having a melting point of no more than 220° C. for said copolymer.

15. The copolymer of claim 14 wherein the molar amount of perfluoro(alkyl vinyl ether) present is no more than 10%.

16. The copolymer of claim 15 having a melting point of no more than 210° C.

17. The copolymer of claim 14, wherein the molar ratio of said tetrafluoroethylene to said ethylene is in the range of from 70/30 to 55/45.

18. The copolymer of claim 14 wherein the molar ratio of said tetrafluoroethylene to said ethylene is greater than 60/40.

* * * * *